(12) United States Patent
Okumura et al.

(10) Patent No.: US 8,474,800 B2
(45) Date of Patent: Jul. 2, 2013

(54) FLUID FILLED TYPE VIBRATION DAMPING DEVICE

(75) Inventors: Kei Okumura, Kakamigahara (JP); Noritaka Matsuoka, Inuyama (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 370 days.

(21) Appl. No.: 12/585,245

(22) Filed: Sep. 9, 2009

(65) Prior Publication Data

US 2010/0102495 A1    Apr. 29, 2010

(30) Foreign Application Priority Data

Oct. 28, 2008   (JP) ................................. 2008-276445

(51) Int. Cl.
*F16F 5/00*   (2006.01)

(52) U.S. Cl.
USPC ..................................................... 267/140.13

(58) Field of Classification Search
USPC ............. 267/140.13, 136, 140.5, 141.4
See application file for complete search history.

(56) References Cited

U.S. PATENT DOCUMENTS

| | | | | |
|---|---|---|---|---|
| 4,750,719 A | * | 6/1988 | Hartel | 267/219 |
| 4,997,168 A | * | 3/1991 | Kato | 267/140.13 |
| 6,267,362 B1 | * | 7/2001 | Satori et al. | 267/140.13 |
| 6,311,963 B1 | * | 11/2001 | Suzuki et al. | 267/140.13 |
| 6,311,964 B1 | * | 11/2001 | Suzuki | 267/140.13 |
| 6,349,927 B1 | | 2/2002 | Suzuki | |
| 7,044,455 B2 | | 5/2006 | Yoshida et al. | |
| 7,168,692 B2 | | 1/2007 | Maeno et al. | |
| 7,413,174 B2 | * | 8/2008 | Okumura et al. | 267/140.13 |

FOREIGN PATENT DOCUMENTS

| | | |
|---|---|---|
| JP | A-10-339348 | 12/1998 |
| JP | A-2005-214352 | 8/2005 |
| JP | A-2007-85515 | 4/2007 |
| JP | B2-4039827 | 1/2008 |

* cited by examiner

*Primary Examiner* — Bradley King
*Assistant Examiner* — Vishal Sahni
(74) *Attorney, Agent, or Firm* — Oliff & Berridge, PLC

(57) ABSTRACT

A fluid filled type vibration damping device including an elastic rubber body elastically connecting an inner shaft member and an outer tube member. The elastic rubber body has a solid rubber wall that includes inside face recesses and outside face recesses respectively formed to either side of the inner shaft member in an axis-perpendicular direction so that a pair of thin portions and a pair of thick portions respectively situated in opposition along mutually orthogonal axes lying in axis-perpendicular directions are formed in the solid rubber wall. A deepest part of the inside face recesses is situated towards an axial small diameter side of the solid rubber wall with respect to an deepest part of the outside face recesses, with the inside face recesses and the outside face recesses overlapping one another in the axis-perpendicular direction of the solid rubber wall.

12 Claims, 7 Drawing Sheets

FLUID FILLED TYPE VIBRATION DAMPING DEVICE

INCORPORATED BY REFERENCE

The disclosure of Japanese Patent Application No. 2008-276445 filed on Oct. 28, 2008 including the specification, drawings and abstract is incorporated herein by reference in its entirety.

BACKGROUND OF THE INVENTION

1. Field of the Invention

The present invention relates generally to a vibration damping device adapted to be interposed between members that make up a vibration transmission system in order to provide vibration damped linkage and/or vibration damped support to these members; and relates in particular to a fluid filled type vibration damping device that utilizes vibration damping action based on the flow action of a non-compressible fluid filling the interior.

2. Description of the Related Art

There are a number of known vibration damping devices designed to be interposed between members that make up a vibration transmission system in order to provide vibration damped linkage and vibration damped support to the members that make up the vibration transmission system. Such vibration damping devices will have an inner shaft fitting that attaches to one of the members that make up the vibration transmission system, and an outer tube fitting that attaches to the other member, with these fittings being elastically linked by an elastic rubber body. Additionally, one known class of vibration damping device is a vibration damping device of fluid filled design having a pressure receiving chamber and an equilibrium chamber whose interiors are filled with a non-compressible fluid, wherein the pressure receiving chamber and equilibrium chamber communicate with one another through an orifice passage. With a fluid filled type vibration damping device of this design, excellent vibration damping capabilities can be achieved based on the resonance action of fluid induced to flow through the orifice passage, and the use of such devices in applications such as automotive engine mounts, body mounts, and member mounts is currently under study.

In instances where a fluid filled type vibration damping device is employed for an application such as an automotive engine mount, the device will be subjected to input of vibration not only in the principal vibration input direction, i.e. the vehicle vertical direction, but in the vehicle lengthwise direction and vehicle lateral direction as well. Accordingly, depending on the required capabilities of the vehicle, it may be necessary for the engine mount to have different spring characteristics in the vehicle lengthwise direction versus the vehicle lateral direction. For example, it has been attempted to maintain a low spring constant in the vehicle lengthwise direction in order to reduce rumbling noise during acceleration and shock during deceleration, while establishing a fairly high spring constant in the vehicle lateral direction with a view to reducing transmission of sideways vibration which can be a problem when the vehicle is idling.

As a means for producing such different spring characteristics in two directions in the axis-perpendicular plane, there have been proposed, for example in Japanese Patent No. 4039827 and U.S. Pat. No. 6,349,927, fluid filled type vibration damping devices whose longitudinal cross sectional shape (cross sectional shape in the axis-perpendicular direction) vary in the vehicle lengthwise direction and in the vehicle lateral direction. Specifically, in Japanese Patent No. 4039827 and U.S. Pat. No. 6,349,927, there are disclosed structures in which a pair of pocket portions have been formed in zones situated in opposition to either side of the inner shaft fitting along a diametrical axis, thus imparting the elastic rubber body with reduced thickness in the portions where the pockets are formed. This has the effect of lowering the spring constant in the thinner portions of the elastic rubber body, thereby making it possible for example, by aligning the axis-perpendicular direction of opposition of the pair of pockets with the vehicle lateral direction, to concomitantly achieve the hard spring characteristics required in the vehicle lengthwise direction as well as the soft spring characteristics required in the vehicle lateral direction.

However, the fluid filled type vibration damping devices disclosed in Japanese Patent No. 4039827 and U.S. Pat. No. 6,349,927 do not provide a wholly satisfactory solution. Specifically, the fluid filled type vibration damping devices of Japanese Patent No. 4039827 and U.S. Pat. No. 6,349,927 are taught as having structures in which a pair of pocket portions formed so as to open onto the inside peripheral face of the elastic rubber body are employed as the means for localized thinning of the elastic rubber body. However, where the elastic rubber body has been thinned through formation of pocket portions in this way, it has proven difficult to ensure sufficient durability of the component while at the same time achieving the desired spring ratio in the vehicle lengthwise direction versus the vehicle lateral direction.

More specifically, in order to establish soft spring characteristics for the elastic rubber body, it is preferable to reduce the thickness of the elastic rubber body, as well as to incline the principal elastic axis (which extends in the direction of opposition of the inner shaft member and the outer tube member) by a sufficiently large degree with respect to the axis-perpendicular direction. However, where localized thinning of the elastic rubber body has been accomplished exclusively through indentation of the elastic rubber body along its inner circumference, the angle of incline of the principal elastic axis will be limited by the angle of incline of the surface of the elastic rubber body. As a result, considerable thinning of the elastic rubber body will be necessary in order to achieve the desired spring ratio in two axis-perpendicular directions, making it difficult to concomitantly achieve adequate durability. Moreover, localized thinning of the elastic rubber body accomplished exclusively through indentation of the elastic rubber body along its inner circumference will have the effect of producing extremely large changes in contours along the inside peripheral face of the elastic rubber body in the circumferential direction. As a result, stress concentrations tended to form in boundary sections between thin portions and thick portions, so reduced durability of the elastic rubber body was a problem. If on the other hand the thin portions of the elastic rubber body are made thicker with a view to ensuring sufficient durability of the elastic rubber body, it becomes difficult to achieve the desired spring ratio in the vehicle lengthwise direction versus the vehicle lateral direction.

SUMMARY OF THE INVENTION

It is therefore one object of the present invention to provide a fluid filled type vibration damping device of novel structure adapted to impart the elastic rubber body with greatly differing spring characteristics in two mutually orthogonal axis-perpendicular directions, yet able to ensure durability on the part of the elastic rubber body.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

Specifically, the present invention provides a fluid filled type vibration damping device including: an inner shaft member; an outer tube member situated such that the inner shaft member is situated to a side of and spaced apart from a first opening of the outer tube member; an elastic rubber body elastically connecting the inner shaft member and the outer tube member; a pressure receiving chamber whose wall is partially defined by the elastic rubber body and filled with a non-compressible fluid; an equilibrium chamber whose wall is partially defined by a flexible film and filled with a non-compressible fluid; and an orifice passage connecting the pressure receiving chamber and the equilibrium chamber with one another, wherein the elastic rubber body has a solid rubber wall of frustoconical shape defining the wall of the pressure receiving chamber, with the inner shaft member bonded to a small-diameter end of the solid rubber wall and the first opening of the outer tube member being bonded to an outside peripheral face of a large-diameter end of the solid rubber wall, wherein inside face recesses that open onto an end face of the large-diameter end of the solid rubber wall and outside face recesses that open onto an outside peripheral face of the solid rubber wall are respectively formed to either side of the inner shaft member in an axis-perpendicular direction so that a pair of thin portions and a pair of thick portions respectively situated in opposition along mutually orthogonal axes lying in axis-perpendicular directions are formed in the solid rubber wall; wherein a deepest part of the inside face recesses lies towards the inner shaft member side with the inside face recesses having an axis-perpendicular direction cross sectional shape that becomes progressively shallower towards the outer tube member side; wherein a deepest part of the outside face recesses lies towards the outer tube member side with the outside face recesses having an axis-perpendicular direction cross sectional shape that becomes progressively shallower towards the inner shaft member side; wherein inside peripheral sections of the inside face recesses have axially indented contours by virtue of indentation in an axial direction at an outside peripheral side of a distal end section of the inner shaft member; and wherein the deepest part of the inside face recesses situated in an inside peripheral section of the solid rubber wall is situated towards an axial small diameter side of the solid rubber wall with respect to the deepest part of the outside face recesses situated in an outside peripheral section of the solid rubber wall, with the inside face recesses and the outside face recesses overlapping one another in the axis-perpendicular direction of the solid rubber wall.

With the fluid filled type vibration damping device of construction according to the present invention, a pair of thin portions are formed on the solid rubber wall that constitutes the elastic rubber body, in zones situated in opposition to one another in the diametrical direction. With this arrangement, when vibration load is input in the axis-perpendicular direction, the solid rubber wall will exhibit a low spring constant along the axis-perpendicular direction axis in which the pair of thin portions lie. For this reason, it Will be possible to establish a large differential between the spring constant of the solid rubber wall in the direction of the axis-perpendicular axis on which lie the pair of thin portions, versus the spring constant of the solid rubber wall in the direction of the axis-perpendicular axis on which lie the pair of thick portions, thereby making it possible to achieve both vibration isolation in the direction of opposition of the thin portions, as well as vibration attenuation or damping in the direction of opposition of the thick portions.

In the fluid filled type vibration damping device of construction according to the present invention, in addition to inside face recesses that open towards its large diameter end face, the solid rubber wall is provided with outside face recesses that open towards the small-diameter end on its outside peripheral face. The deepest part of the inside face recesses lies towards the inner shaft member side, while the deepest part of the outside face recesses lies towards the outer tube member side, with the inside face recesses and the outside face recesses being situated so as to overlap one another in the axis-perpendicular direction and thereby define the thin portions on the solid rubber wall. For this reason, the center axis of the solid rubber wall and the principal elastic axis of the solid rubber wall in the thin portion-defining zones can form a smaller angle, as compared to the case where only inside face recesses have been formed. As a result, it will be possible to establish a smaller spring constant of the solid rubber wall in the direction of the axis-perpendicular axis along which lie the pair of thin portions, and to produce a greater spring constant differential between two mutually orthogonal axes extending in axis-perpendicular directions.

Moreover, by forming recesses on both the large diameter end face and the outside peripheral face of the solid rubber wall, the inside face recess and the outside face recess can have shallower depth as compared to the case where only inside face recesses are formed. For this reason, change in surface contours of the solid rubber wall can be kept to a minimum, and damage to the solid rubber wall due to stress concentrations can be prevented. Consequently, improved durability of the solid rubber wall can be advantageously achieved.

In the preferred form of the fluid filled type vibration damping device of construction according to the present invention, outside peripheral sections of the outside face recesses in the thin portions of the solid rubber wall are of shapes that are recessed in the axis-perpendicular direction to a greater extent than outside peripheral sections of the thick portions; and bottom faces of the outside peripheral sections of the outside face recesses extend in the axis-perpendicular direction without any recession in the axial direction.

With this design it will be possible to prevent the outside peripheral section of the solid rubber wall, which is typically thinner than its inside peripheral section, from becoming even thinner due to the outside peripheral section of the outside face recesses, and making the spring rigidity of the wall of the pressure receiving chamber lower than necessary. For this reason, during input of vibration in the vertical direction, i.e. the principal vibration input direction, drastic escape of liquid pressure of the pressure receiving chamber due to elastic deformation of the solid rubber wall can be prevented, so that relative pressure fluctuations can efficiently arise between the pressure receiving chamber and the equilibrium chamber. As a result, flow of fluid through the orifice passage between the two chambers can be efficiently produced, and vibration damping action can be effectively achieved based on flow action of the fluid.

Additionally, by imparting to the outside face recesses contours that are recessed in the axis-perpendicular direction, thinning of the solid rubber wall, as well as adjustment of the incline angle of the principal elastic axis in the thin portion-defining zones of the solid rubber wall, can be achieved while at the same time ensuring sufficient wall spring rigidity in the outside peripheral section of the solid rubber wall.

In yet preferred form of the fluid filled type vibration damping device of construction according to the present invention, outside peripheral sections of the outside face recesses in the thin portions of the solid rubber wall are of shapes that are recessed in the axial direction to a greater extent than outside peripheral sections of the thick portions.

With this design it will be possible to more drastically thin the solid rubber wall by means of the outside face recesses; and for the center axis of the solid rubber wall and the principal elastic axis of the thin portions of the solid rubber wall to form a smaller angle. For this reason, the spring constant of the solid rubber wall can be more effectively reduced in the diametrical direction along the axis of opposition of the pair of thin portions, so that better vibration isolating effect can be achieved.

In yet preferred form of the fluid filled type vibration damping device of construction according to the present invention, the outside face recesses made on the solid rubber wall are formed such that they do not extend to a location axially inward with respect to the outer tube member; while the inside face recesses made on the solid rubber wall are formed with a depth reaching a location axially outward with respect to the outer tube member.

With this design, it will be possible to ensure that sufficient of rubber volume is present in the outside peripheral section of the solid rubber wall elastic body so as to afford ample wall spring rigidity of the pressure receiving chamber; while at the same time making it possible to advantageously reduce the spring constant of the solid rubber wall in the axis-perpendicular direction of opposition of the thin portions. In preferred practice, the inside face recesses will be designed to reach a location axially outward with respect to the outer tube member even when the device has been installed in a vibration transmission system, whereby a smaller spring constant can be more effectively obtained.

In yet preferred form of the fluid filled type vibration damping device of construction according to the present invention, with the device installed in a vibration transmission system, an axial distal end section of the inner shaft member extends to a location axially inward from one axial opening of the outer tube member; in this installed state, the thick portions of the solid rubber wall is interposed between axis-perpendicularly opposed faces of the inner shaft member and the outer tube member; and in the thin portions of the solid rubber wall, the inside face recesses are formed through indentation of the solid rubber wall between the axis-perpendicularly opposed faces of the inner shaft member and the outer tube member.

With this design, at times of vibration input, in the diametrical direction along which the pair of thick portions lie, compressive deformation will predominate and the spring constant will be large. Ample attenuation will be afforded thereby, thus reducing rumbling noise occurring during acceleration of the vehicle, as well as shock produced by striking of the stopper during acceleration or deceleration for example. On the other hand, in the diametrical direction along which the pair of thin portions lie, at times of vibration input, shear deformation will predominate and the spring constant will be small. Thus, isolation of vibration can be sufficiently achieved, and sideways vibration of the engine can be reduced, for example.

In the further preferred form fluid filled type vibration damping device of construction according to the present invention, both the outside face recesses and the inside face recesses have fan shaped contours extending gradually in a circumferential direction from the inner shaft member side towards the outer tube member side, as seen in axial view of the solid rubber wall.

With this design, both the outside face recesses and the inside face recesses are imparted with fan shaped contours extending in the circumferential direction towards the outside peripheral side having extended circumferential length, thereby efficiently reducing the spring constant in the axis-perpendicular direction in which the pair of thin portions lie. Furthermore, the desired effect of reduced spring constant can be achieved with a bare minimum of surface area, so that improved durability of the solid rubber wall can be attained.

In the further preferred form of the fluid filled type vibration damping device of construction according to the present invention, the inner shaft member has a distal end section of inverted frustoconical shape extending axially inward into the solid rubber wall, and a basal section of round tubular shape extending axially outward from a large diameter end part of the distal end section; the basal section is provided with a projecting portion that extends outwardly in the axis-perpendicular direction at a location projected axially outward from the small-diameter end of the solid rubber wall; the solid rubber wall is bonded at the small-diameter end thereof to the distal end section and the basal section of the inner shaft member and to the bottom face of the projecting portion; and the inside face recesses of the thin portions have contours produced through indentation along an outside peripheral face of the distal end section.

By imparting contours such as these to the inner shaft member and to the inside face recesses, the inside face recesses can be formed with ample depth at their deepest part at locations in proximity to the inner shaft member. Thus, the angle of incline of the principal elastic axis of the solid rubber wall with respect to the axial direction can be efficiently set to a small angle.

In the preferred form of the fluid filled type vibration damping device constructed according to the present invention, the inner shaft member in a section thereof that is anchored to the solid rubber wall may have dimensions in a first axis-perpendicular direction of opposition of the thin portions that are smaller than dimensions in another axis-perpendicular direction of opposition of the thick portions.

With this design, it is possible to ensure that the solid rubber wall has large free length in the axis-perpendicular direction in which the pair of thin portions lie in opposition, and to prevent damage to the solid rubber wall occurring during elastic deformation of the solid rubber wall caused by vibration input. Particularly if the solid rubber wall has experienced input of a large impact load in the axial direction, the solid rubber wall can be effectively prevented from buckling, so durability can be improved.

In yet preferred form of the fluid filled type vibration damping device constructed according to the present invention, the elastic rubber body may be composed entirely of the solid rubber wall of solid structure. By imparting the elastic rubber body in its entirety with a solid structure devoid of liquid chambers and spaces, ample rubber volume can be advantageously assured, and improved durability can be attained.

In further preferred form of the fluid filled type vibration damping device of construction according to the present invention, one end of the outer tube member is blocked off by the solid rubber wall, and another end of the outer tube member is covered by the flexible film, and a partition member is disposed between opposing faces of the elastic rubber body and the flexible film while being supported by the outer tube member thereby define the pressure receiving chamber to one side of the partition member and the equilibrium chamber to another side of the partition member.

The present invention may also be implemented in this kind of fluid filled type vibration damping device having a structure equipped with a partition member.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

A more specific understanding of the invention will be provided through the following detailed description of the embodiments of the present invention, made with reference to the accompanying drawings.

Figure 1:
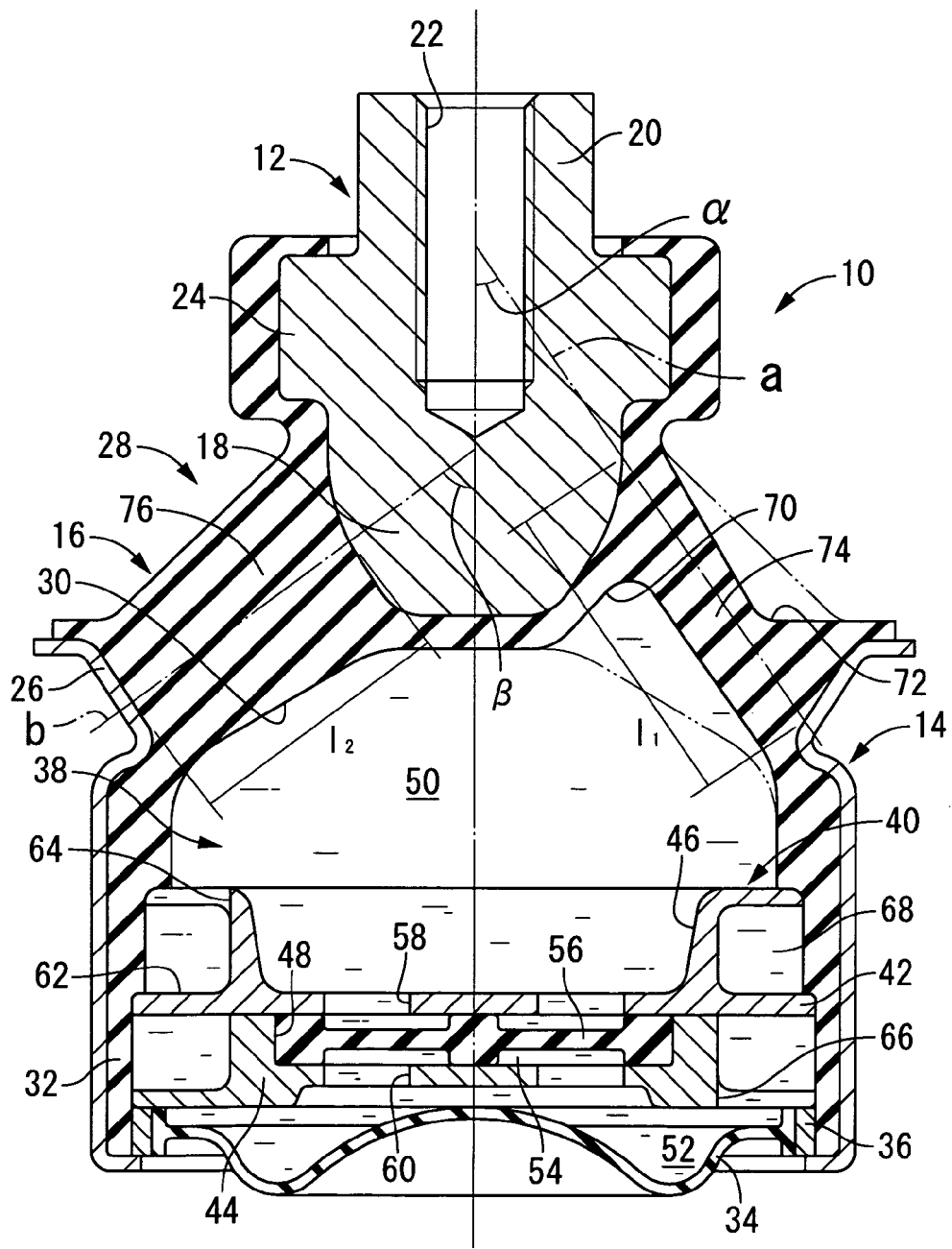
FIG. 1 is an elevational view in axial or vertical cross section of a fluid filled type vibration damping device in the form of an engine mount, which is constructed according to a first embodiment of the invention, taken along line 1-1 of FIG. 5.
Figure 2:
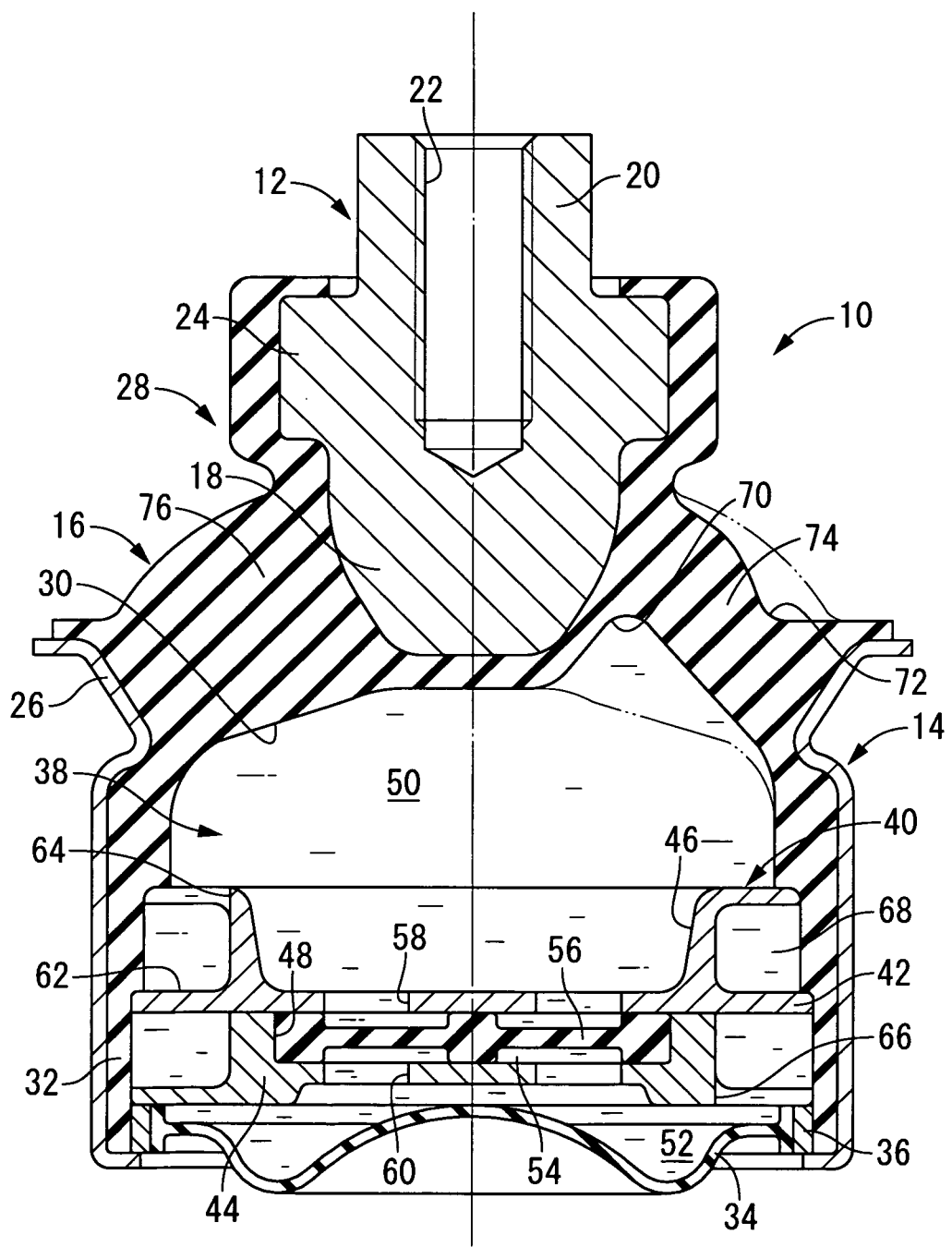
FIG. 2 is an elevational view in axial or vertical cross section showing the engine mount of FIG. 1 installed in a vehicle, corresponding to FIG. 1.

Referring first to FIGS. 1 and 2, there is depicted an automotive engine mount 10 as a first embodiment of the fluid filled type vibration damping device of construction according to the present invention. The engine mount 10 has a construction in which an inner shaft member 12 of metal and an outer tube member 14 of metal are connected to one another by an elastic rubber body 16. The inner shaft member 12 is then mounted onto the power unit side (not shown) while the outer tube member 14 is mounted onto the vehicle body side (not shown), whereby the engine mount 10 is interposed between the power unit and the vehicle body in such a way as to provide vibration damped linkage of the power unit to the vehicle body. In the description hereinbelow, the vertical direction refers to the vertical direction in FIG. 1, which is also the principal direction of vibration input as well as the axial direction. In FIG. 1, the engine mount 10 is depicted in isolation prior to installation in a vehicle; in FIG. 2, the engine mount 10 is depicted installed in a vehicle.

To describe in greater detail, the inner shaft member 12 is a high-rigidity member made of metal such as iron or aluminum alloy having a distal end section 18 of inverted, generally frustoconical shape. The distal end section 18 on its outside peripheral face has tapered contours that progressively constrict in diameter towards the bottom in the axial direction; in the present embodiment in particular, it has curving contours that towards the top exhibit progressively smaller slope angles with respect to the axial direction. A basal section 20 is integrally formed above the distal end section 18 in the axial direction. The basal section 20 is of generally circular post shape and extends upward in the axial direction from the upper end, i.e. the large-diameter end, of the distal end section 18. A bolt hole 22 that extends in the vertical direction along the center axis has been formed in the basal section 20 and opens onto the upper end face of the basal section 20. An annular projecting portion 24 is integrally formed in the axially medial section of the basal section 20. The projecting portion 24 is of flanged shape projecting outward in the diametrical direction from the lower end part of the basal section 20; in the present embodiment, it is disposed extending continuously about the entire circumference. Also, in the present embodiment, the projecting portion 24 has a larger outside diameter dimension than the outside diameter dimension of the large-diameter end of the distal end section 18, and thus the projecting portion 24 will project further outward in the diametrical direction than does the distal end section 18.

The outer tube member 14 has a thin, large-diameter, generally round tube shape overall and constitutes a high-rigidity component similar to the inner shaft member 12. The outer tube member 14 is provided in proximity to its upper end with a neck that is recessed diametrically inward; and a tapered tube portion 26 is integrally formed so as to project upward from the inside peripheral edge of this neck. The tapered tube portion 26 has tapered contours of gradually flaring diameter towards the top in the axial direction. In the present embodiment in particular, the inside peripheral face of the tapered tube portion 26 in the outer tube member 14 is situated in opposition to the outside peripheral face of the distal end section 18 of the inner shaft member 12.

The inner shaft member 12 is positioned spaced apart to the axial upper opening side of the outer tube member 14 and is aligned on the same center axis therewith, with the inner shaft member 12 and the outer tube member 14 being elastically linked together by the elastic rubber body 16. The elastic rubber body 16 is generally frustoconical in shape overall, and at the small-diameter end thereof the distal end section 18 of the inner shaft member 12 has been subjected to vulcanization bonding in an embedded condition, and at the small-diameter end face thereof the projecting portion 24 of the inner shaft member 12 has been subjected to vulcanization bonding with its bottom face juxtaposed thereagainst, while at the outside face at the large-diameter end thereof the inside peripheral face of the upper opening of the outer tube member 14 has been subjected to vulcanization bonding while juxtaposed thereagainst. As will be appreciated from the above, in the present embodiment, the elastic rubber body 16 constitutes an integrally vulcanization molded component 28, depicted in FIG. 3, which incorporates the inner shaft member 12 and the outer tube member 14. In the present embodiment, the elastic rubber body 16 is formed by a solid rubber elastic body that is devoid of recesses and spaces in its axially medial section; the elastic rubber body 16 in its entirety is constituted by the solid rubber wall of the present embodiment. Moreover, in the present embodiment, the small-diameter end of the elastic rubber body 16 is anchored to the outside peripheral face of the distal end section 18, to the outside peripheral face of the lower end of the basal section 20, and to the bottom face of the projecting portion 24; while the outside peripheral face of the large-diameter end is anchored to the inside peripheral face of the tapered tube portion 26.

A large diameter recess 30 that opens onto the large diameter end face is formed in the elastic rubber body 16. The large diameter recess 30 has an inverted, generally bowl shape becoming progressively smaller in diameter towards the top. Additionally, at the outside peripheral edge of the elastic rubber body 16 there is integrally formed a seal rubber layer 32 that extends down towards the bottom. This seal rubber layer 32 sheathes and covers the inside peripheral face of the outer tube member 14.

As shown in FIGS. 1 and 2, a flexible film 34 is attached to the integrally vulcanization molded component 28 of the elastic rubber body 16. The flexible film 34 is made of a thin rubber film of generally circular disk shape and has ample slack in the axial direction. A fastener fitting 36 is vulcanization bonded to the outside peripheral edge of the flexible film 34. This fastener fitting 36 is generally annular in shape, and its inside peripheral face is anchored to the outside peripheral face of the flexible film 34 about the entire circumference. In the present embodiment, the flexible film 34 is provided as an integrally vulcanization molded component incorporating the fastener fitting 36.

The flexible film 34 having this type of fastener fitting 36 is inserted into the outer tube member 14 from the lower opening thereof and attached to the outer tube member 14. Specifically, with the fastener fitting 36 having been slipped into the lower end of the outer tube member 14, the outer tube member 14 is subjected to a diameter reduction operation to clasp and secure the fastener fitting 36 inside the outer tube member 14, attaching the flexible film 34 to the outer tube member 14. In the present embodiment, the edge at the lower end of the outer tube member 14 has been subjected to crimping inwardly in the diametrical direction, thereby preventing the fastener fitting 36 from becoming dislodged in the downward direction.

By then attaching the flexible film 34 to the integrally vulcanization molded component 28 of the elastic rubber body 16, the upper opening of the outer tube member 14 will be blocked off fluidtightly by the elastic rubber body 16, while the lower opening of the outer tube member 14 will be blocked off fluidtightly by the flexible film 34. By so doing, between the axially opposed faces of the elastic rubber body 16 and the flexible film 34 there will be defined a fluid chamber 38 that is fluidtightly isolated from the space outside and in which a non-compressible fluid has been sealed. While no particular limitation is imposed on the non-compressible fluid for sealing inside the fluid chamber 38, a low viscosity fluid such as water is preferable so as to effectively give rise to vibration damping action based on flow action of the fluid, discussed later.

A partition member 40 of metal is disposed in the fluid chamber 38. The partition member 40 has a thick, generally circular disk shape overall, and in the present embodiment includes an upper segment fitting 42 and a lower segment fitting 44. The upper segment fitting 42 has a thick, generally circular disk shape overall, with a center recess 46 that opens towards the top in the axial direction being formed in its diametrical center section. Meanwhile, the lower segment fitting 44, like the upper segment fitting 42, has a thick, generally circular disk shape overall, with a housing recess 48 that opens towards the top in the axial direction being formed in its diametrical center section.

The upper segment fitting 42 and the lower segment fitting 44 are stacked in the axial direction in order to produce the partition member 40. This partition member 40 is arranged such that, supported by the outer tube member 14, it extends in the axis-perpendicular direction inside the fluid chamber 38. The fluid chamber 38 is thereby divided into two parts to either side of the partition member 40, forming to the axially upper side of the partition member 40 a pressure receiving chamber 50 whose wall is partly defined by the elastic rubber body 16 and that gives rise to internal pressure fluctuations at times of vibration input. Meanwhile, to the axially lower side of the partition member 40 there is formed an equilibrium chamber 52 whose wall is partly defined by the flexible film 34 and that readily permits changes in volume. The pressure receiving chamber 50 and the equilibrium chamber 52, as well as an orifice passage 68 to be discussed later, are each filled with the non-compressible fluid that fills the fluid chamber 38.

The opening of the housing recess 48 that has been formed in the lower segment fitting 44 is covered by the upper segment fitting 42, thereby advantageously forming a housing area 54 in the interior of the partition member 40. Also, a moveable rubber film 56 is housed and positioned within this housing area 54. The moveable rubber film 56 is made of a rubber elastic body having a generally circular disk shape overall, and has greater thickness at its diametrical center section and outside peripheral section respectively. The moveable rubber film 56 is positioned within the housing area 54, with its thick portions clasped between the upper and lower segment fittings 42, 44.

The housing area 54 also communicates with the pressure receiving chamber 50 through a plurality of upper communication holes 58 that pass through the bottom wall of the center recess 46 of the upper segment fitting 42, as well as communicating with the equilibrium chamber 52 through a plurality of lower communication holes 60 that pass through the bottom wall of the housing recess 48 of the lower segment fitting 44. Through this design, the thin section of the moveable rubber film 56 at its upper face will be exposed to the action of the liquid pressure of the pressure receiving chamber 50, and at its lower face will be exposed to the action of the liquid pressure of the equilibrium chamber 52. As a result, the moveable rubber film 56 constitutes a liquid pressure absorbing mechanism whereby internal pressure fluctuations of the pressure receiving chamber 50 are transmitted to and absorbed by the equilibrium chamber 52 by means of minute deformations taking place in the thin section of the moveable rubber film 56.

In the outside peripheral section of the partition member 40 there is formed a circumferential groove 62 of helical shape that extends for a prescribed length just short of twice around the circumference. The outside peripheral opening of this circumferential groove 62 is covered fluidtightly by the outer tube member 14, thereby forming a tunnel-like passage that extends in the circumferential direction. This passage communicates at one end with the pressure receiving chamber 50 through a communication hole 64 and communicates at the other end with the equilibrium chamber 52 through a communication hole 66, thereby defining an orifice passage 68 through which the pressure receiving chamber 50 and the equilibrium chamber 52 communicate with one another. In the present embodiment, the tuning frequency of the orifice passage 68, which is established based on the ratio (A/L) of passage length (L) to passage area (A) of the orifice passage 68, has been set to a low frequency that corresponds to engine shake.

Here, in the engine mount 10 constructed according to the present embodiment, a pair of inside face recesses 70 and a pair of outside face recesses 72 have been formed in the elastic rubber body 16.

Figure 4:
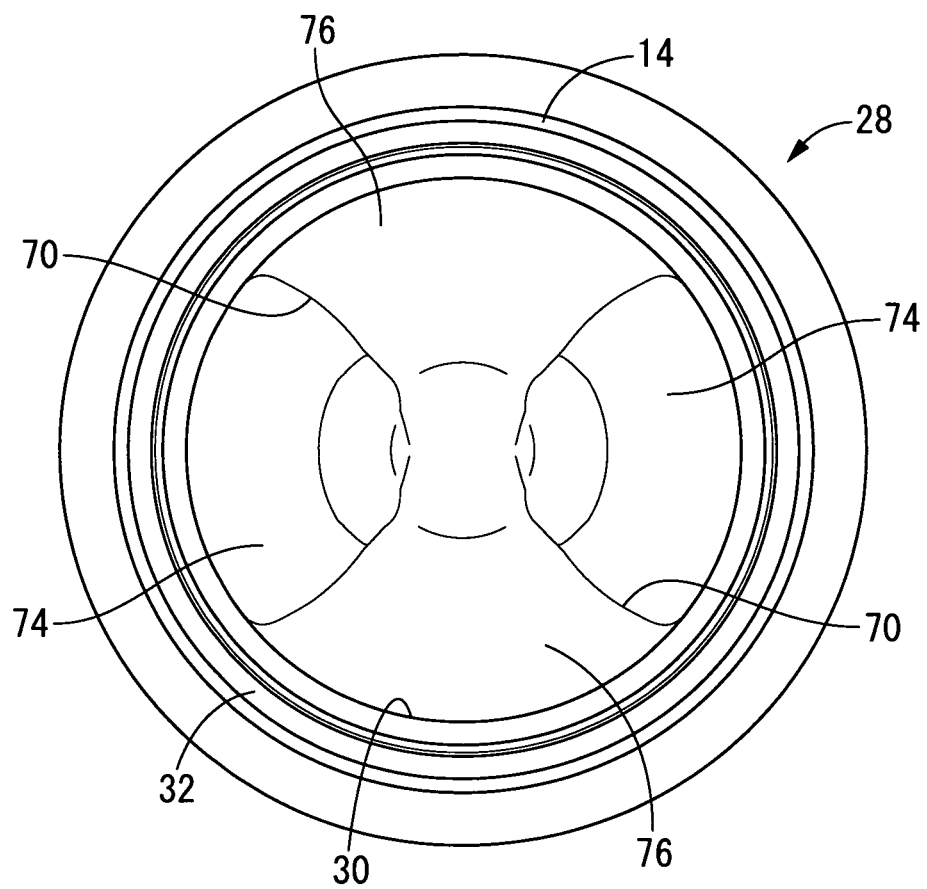
FIG. 4 is a bottom plane view of the integrally vulcanization molded component of FIG. 3.

As shown in FIGS. 1 and 2, the inside face recesses 70 are recesses that open onto the base wall face of the large diameter recess 30 which constitutes the large diameter end face of the elastic rubber body 16, and are indented in the axial direction in such a way so as to form indentations in the axial direction in the elastic rubber body 16. The inside face recesses 70 have contours that progressively flare open in the diametrical direction towards the axial bottom side, i.e. the opening side, with the outside peripheral sections of the inside face recesses 70 becoming progressively shallower towards the outside peripheral side. Further, as depicted in FIG. 4, viewed in the axial direction the inside face recesses 70 appear generally fan-shaped with their circumferential dimension becoming progressively larger towards the outside in the diametrical direction. The pair of inside face recesses 70, 70 are formed on the elastic rubber body 16 so as to be situated in opposition to either side of the inner shaft member 12 along an axis lying in the diametrical direction.

Furthermore, the deepest part in which the inside face recess 70 reaches maximum depth in the axial direction is disposed eccentrically towards the center in the diametrical direction of the elastic rubber body 16. In the present embodiment, the inside peripheral section of the base face of the inside face recess 70 is defined by a tapered face extending along the outside peripheral face of the distal end section 18, while the outside peripheral section of its base face is defined by a tapered face extending along a straight line that connects the upper end of the distal end section 18 with the lower end of the tapered tube portion 26. The section where these tapered faces intersect constitutes the deepest part of the inside face recess 70; in the present embodiment, this section will be situated to the outside peripheral side of the distal end section 18 of the inner shaft member 12, and lying within the axial projection area (below the projecting portion 24) of the inner shaft member 12. Since the inside peripheral section of the base face of the inside face recess 70 is defined by a tapered face extending along the outside peripheral face of the distal end section 18 of the inner shaft member 12, sufficient depth on the part of the inside face recess 70 can be efficiently assured.

Additionally, the inside face recesses 70 are formed with sufficient dimensions in the axial direction such that their deepest portion will be situated axially above the axial upper end of the outer tube member 14. In the present embodiment in particular, the inside face recesses 70 are situated with their deepest portion overlapping the inner shaft member 12 as projected along the axis-perpendicular direction.

Figure 3:
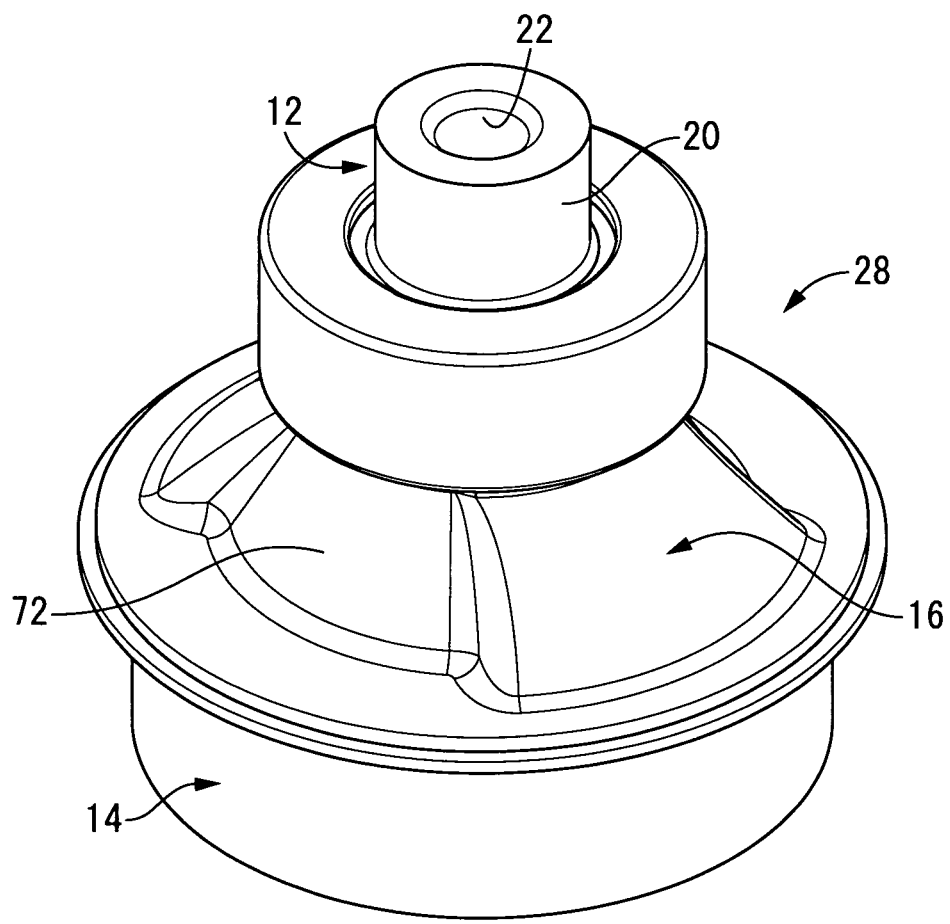
FIG. 3 is a perspective view of an integrally vulcanization molded component of the engine mount of FIG. 1.
Figure 5:
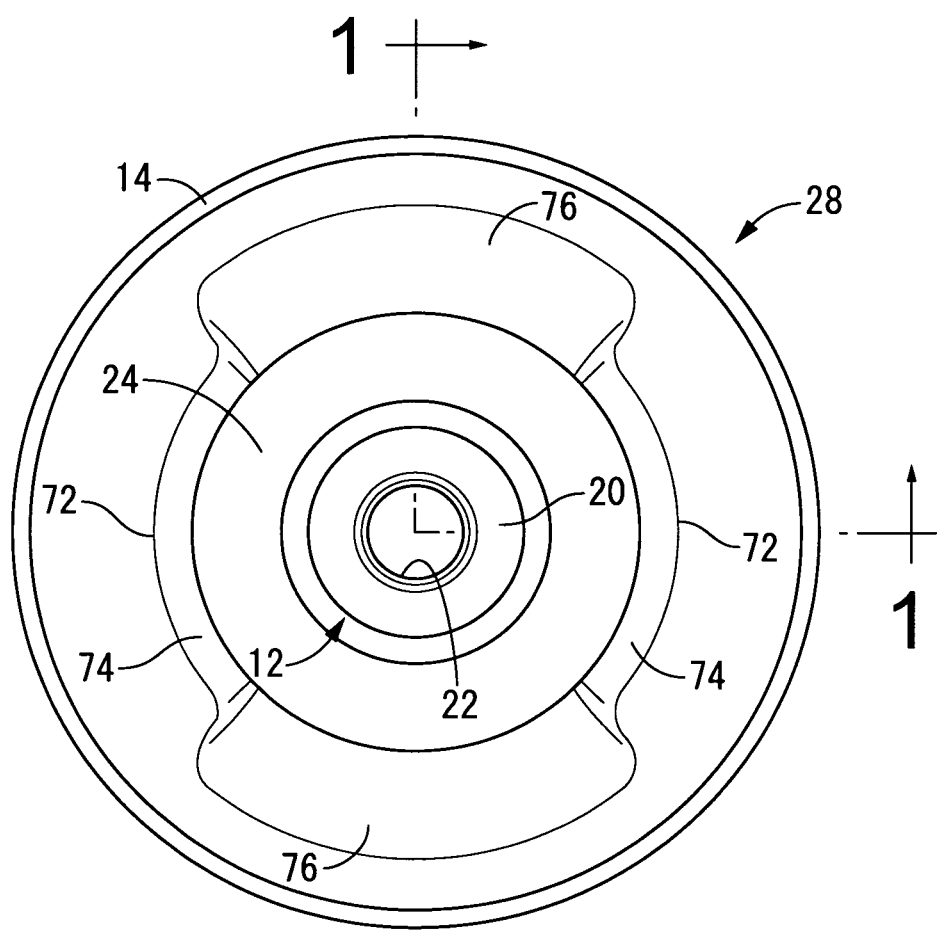
FIG. 5 is a top plane view of the integrally vulcanization molded component of FIG. 3.

As shown in FIGS. 1 to 3, the outside face recesses 72 open onto the outside peripheral face of the elastic rubber body 16 and are recessed in the axis-perpendicular direction; at the base wall face the inside peripheral section slopes downward towards the outside peripheral side, and the inside peripheral section of the outside face recesses 72 becomes progressively shallower towards the inside peripheral side. Additionally, as depicted in FIG. 5, viewed in the axial direction the outside face recesses 72 appear generally fan-shaped with progressively larger circumferential dimension towards the outside in the diametrical direction. The pair of outside face recesses 72, 72 are formed on the elastic rubber body 16 so as to be situated in opposition to either side of the inner shaft member 12 along an axis lying in the diametrical direction.

Furthermore, the deepest part in which the outside face recess 72 reaches maximum depth in the axial direction is situated eccentrically towards the outside peripheral side in the diametrical direction of the elastic rubber body 16. In the present embodiment, the inside peripheral section of the base face of the outside face recess 72 is defined by a tapered face extending along a straight line that connects the upper end of the distal end section 18 with the lower end of the tapered tube portion 26, while the outside peripheral section of the base face is defined by a flat face extending in the axis-perpendicular direction. The section where the inside peripheral section and the outside peripheral section intersect on the base face constitutes the deepest part of the outside face recess 72; in the present embodiment, this section will be situated to the outside peripheral side of inner shaft member 12, and to the inside peripheral side of the outer tube member 14.

Additionally, the outside peripheral section of the base face of the outside face recess 72 extends in the axis-perpendicular direction at a location axially above the upper end of the outer tube member 14, while the deepest part of the outside face recess 72 is located axially above the axial upper end of the outer tube member 14.

The pair of inside face recesses 70, 70 and the pair of outside face recesses 72, 72 are formed so as to be respectively situated in opposition to one another along an axis lying in the diametrical direction. Consequently, the elastic rubber body 16 will have a small thickness dimension in the direction orthogonal to the principal elastic axis: a, which is effectively its thickness dimension. As a result, in the elastic rubber body 16 the sections situated to either side of the inner shaft member 12 along a diametrical axis (in FIGS. 4 and 5, the left-right direction) will define thin portions 74 that are thinner in comparison with the diametrical axis orthogonal thereto (in FIGS. 4 and 5, the vertical direction).

Meanwhile, in the elastic rubber body 16 the sections situated away from the formation zones of the inside and outside face recesses 70, 72 will define thick portions 76 that are thicker in comparison with the thin portions 74, producing a pair of thick portions 76, 76 formed in opposition along a diametrical axis that is approximately orthogonal to the direction of opposition of the pair of thin portions 74, 74. In FIGS. 1 and 2, the double-dot and dash lines depict the longitudinal sectional shape of thick portions 76.

The inside face recesses 70 and the outside face recesses 72 are formed so as to overlap one another when viewed in a diametrical projection of the elastic rubber body 16. Specifically, the deepest part of the inside face recess 70 will be situated eccentrically towards the inside peripheral side, while the deepest part of the outside face recess 72 will be situated eccentrically towards the outside peripheral side; additionally, the deepest part of the inside face recess 70 will be situated at a location axially above the lowermost end of the outside face recess 72. The inside face recesses 70 and the outside face recesses 72 formed in this way will assume an overlapping condition in the axis-perpendicular direction, making the elastic rubber body 16 thinner in the diametrical direction in these sections of overlap of the inside and outside face recesses 70, 72.

Further, in the present embodiment, with the engine mount 10 installed in a vehicle as depicted in FIG. 2, the lower end of the inner shaft member 12 will be thrust into the inside peripheral side of the outer tube member 14 by the distributed load of the power unit. The thick portions 76 will become interposed in the diametrical direction between the inner shaft member 12 and the outer tube member 14; while in the thin portions 74, the inside face recesses 70 will be positioned so as to define indentations in the diametrical direction between the inner shaft member 12 and the outer tube member 14.

Additionally, the deepest part of the inside face recess 70 in which the axial depth reaches maximum is situated eccentrically towards the center in the diametrical direction, while the deepest part in which the axial depth of the outside face recess 72 reaches maximum is situated eccentrically towards the outside peripheral side in the diametrical direction. Thus, as shown in FIG. 1, the angle: α formed by the principal elastic axis: a of the thin portions 74 and the center axis of the mount will be smaller than the angle: β formed by the principal elastic axis: b of the thick portions 76 and the center axis of the mount. These principal elastic axes are indicated in FIG. 1 by dot-and-dash lines and symbols.

Additionally, the longitudinal sectional shape of the thin portions 74 extend in directions connecting the upper end of the distal end section 18 of the inner shaft member 12 with the lower end of the tapered tube portion 26 of the outer tube member 14. Consequently, between the inner shaft member 12 and the outer tube member 14, the free length: $l_1$ of the thin portions 74 of the elastic rubber body 16 will be greater than the free length: $l_2$ of the thick portions 76.

The engine mount 10 constructed in the manner discussed above will be installed by mounting the inner shaft member 12 onto the power unit side using a mounting bolt (not shown) that threads into the bolt hole 22 made in the basal section 20, and mounting the outer tube member 14 onto the vehicle body side via an externally fastened bracket or the like. The engine mount 10 will be installed on the vehicle such that the diametrical axis along which the pair of thin portions 74, 74 are situated in opposition is coincident with the vehicle lateral direction.

In the engine mount 10 constructed in accordance with the present embodiment, thin portions 74 are formed in the elastic rubber body 16 to either side of the inner shaft member 12 in the vehicle lateral direction, thus reducing the thickness of the elastic rubber body 16. Consequently, the spring constant in the vehicle lateral direction will be set to a smaller value as compared with the spring constant in the vehicle lengthwise direction. For this reason, in the vehicle lateral direction, vibration isolating action will be manifested effectively and will reduce vibration caused by sideways vibration of the engine or the like. In the vehicle lengthwise direction meanwhile, vibration attenuating action will be manifested effectively and will reduce rumbling noise occurring during acceleration of the vehicle as well as shock produced by sudden acceleration or deceleration.

Further, the principal elastic axis: a of the elastic rubber body 16 in its thin portions 74 forms a smaller slope angle: α with respect to the axial direction than does the principal elastic axis: b of the elastic rubber body 16 in its thick portions 76. For this reason, at times of vibration input along the axis of opposition of the pair of thin portions 74, 74 in the axis-perpendicular direction (the vehicle lateral direction), shear deformation will predominate in the elastic rubber body 16. As a result, it will be possible for the spring constant in the vehicle lateral direction to be set to a smaller value, and to more effectively realize isolation of vibration in the vehicle lateral direction. Additionally, by utilizing spring during shear deformation (which is lower than spring during compressive deformation), the thin portions 74 can be made relatively thick. Improved durability of the elastic rubber body 16 is possible for this reason.

According to the present embodiment, the thin portions 74 have been produced by forming the inside face recesses 70 whose deepest part is situated to the inside peripheral side so that these open onto the inside peripheral face, and forming the outside face recesses 72 whose deepest part is situated to the outside peripheral side so that these open onto the outside peripheral face. By so doing it is possible to establish a smaller slope angle: a of the principal elastic axis: α with respect to the center axis of the mount. For this reason, the spring constant in the vehicle lateral direction can be set to an even lower level, to more effectively realize low dynamic spring in the vehicle lateral direction as well as improved durability of the elastic rubber body 16.

Additionally, the thin portions 74 of the elastic rubber body 16 are defined cooperatively by the inside face recesses 70 that open onto the inside peripheral face of the elastic rubber body 16 and the outside face recesses 72 that open onto the outside peripheral face of the elastic rubber body 16. Thus, it will be possible for the inside and outside face recesses 70, 72 of fairly shallow depth to impart sufficient thinness to the elastic rubber body 16, as compared to the case where either the inside or outside face recesses are formed exclusively. For this reason, change in surface contours in the circumferential direction can be minimized on both the inside peripheral face and the outside peripheral face of the elastic rubber body 16, and diminished durability of the elastic rubber body 16 due to stress concentrations occurring through formation of the inside and outside face recesses 70, 72 can be reduced.

In the present embodiment it is assured that, in the direction of opposition of the inner shaft member 12 and the outer tube member 14, the free length: $l_1$ of the thin portions 74 will be greater than the free length: $l_2$ of the thick portions 76. For this reason, in the event that a large displacement is input across the inner shaft member 12 and the outer tube member 14 in the vertical direction, i.e. the principal vibration input direction, damage caused by buckling of the thin portions 74 can be prevented, and enhanced durability can be achieved.

Moreover, according to the present embodiment, both the inside and outside face recesses 70, 72 appear fan shaped viewed the axial direction and extend across a progressively wider area in the circumferential direction moving towards the outside peripheral side. Sufficient area to form the thin portions 74 can thereby by assured in the elongated outside peripheral section, while limiting the size of the area for formation of the thin portions 74 in the shorter inside peripheral section. For this reason, it will be possible both to reduce the spring constant in the direction of opposition of the thin portions 74, 74, and to ensure sufficient durability of the thin portions 74.

The engine mount 10 constructed according to the present embodiment allows one to achieve the desired spring ratio in the vehicle lateral direction and vehicle longitudinal direction, and to efficiently giving rise to fluid flow through the orifice passage 68 at times of vibration input in the axial direction, so as to afford the desired vibration damping action.

In greater detail, the inside face recesses 70 are formed with their deepest part situated eccentrically towards the diametrical center, and define indentations that extend in the axial direction into the elastic rubber body 16. Consequently, the diametrical center section of the elastic rubber body 16, which owing to the outside peripheral face contours of the elastic rubber body 16 and the inside peripheral face contours of the large diameter recess 30 is relatively thick, will effectively be made thinner by the presence of the inside face recesses 70.

Meanwhile, the outside face recesses 72 are formed with their deepest part situated eccentrically towards the diametrical outer side, and have a base face at the outside peripheral section that is a flat face extending in the axis-perpendicular direction lacking indentation in the axial direction. Consequently, the outside peripheral section of the elastic rubber body 16, which owing to the outside peripheral face contours of the elastic rubber body 16 and the inside peripheral face contours of the large diameter recess 30 is relatively thin, will not become any thinner due to the presence of the outside face recesses 72, so sufficient thickness in the outside peripheral section may be assured.

By virtue of the above, in a structure having thin portions 74 formed in the elastic rubber body 16 and reduced spring constant in the axis-perpendicular direction, it is possible to ensure that the elastic rubber body 16 that constitutes the wall of the pressure receiving chamber 50 will have sufficient thickness throughout, and to ensure adequate wall spring rigidity of the pressure receiving chamber 50. For this reason, when low frequency vibration corresponding to engine shake is input, the pressure receiving chamber 50 will effectively give rise to pressure fluctuations, and fluid will be induced to flow through the orifice passage 68 on the basis of the relative pressure differential between the pressure receiving chamber 50 and the equilibrium chamber 52. The desired vibration damping action (high attenuating action) may thus be effectively produced on the basis of the resonance action or other flow action of the fluid flowing through the orifice passage 68.

In the present embodiment, the moveable rubber film 56 is provided to the partition member 40. At times of input of medium to high frequency vibration corresponding to idling vibration or rumbling noise, the desired vibration damping action (low dynamic spring action) will be produced on the basis of pressure absorbing action produced by minute deformations of this moveable rubber film 56.

Figure 6:
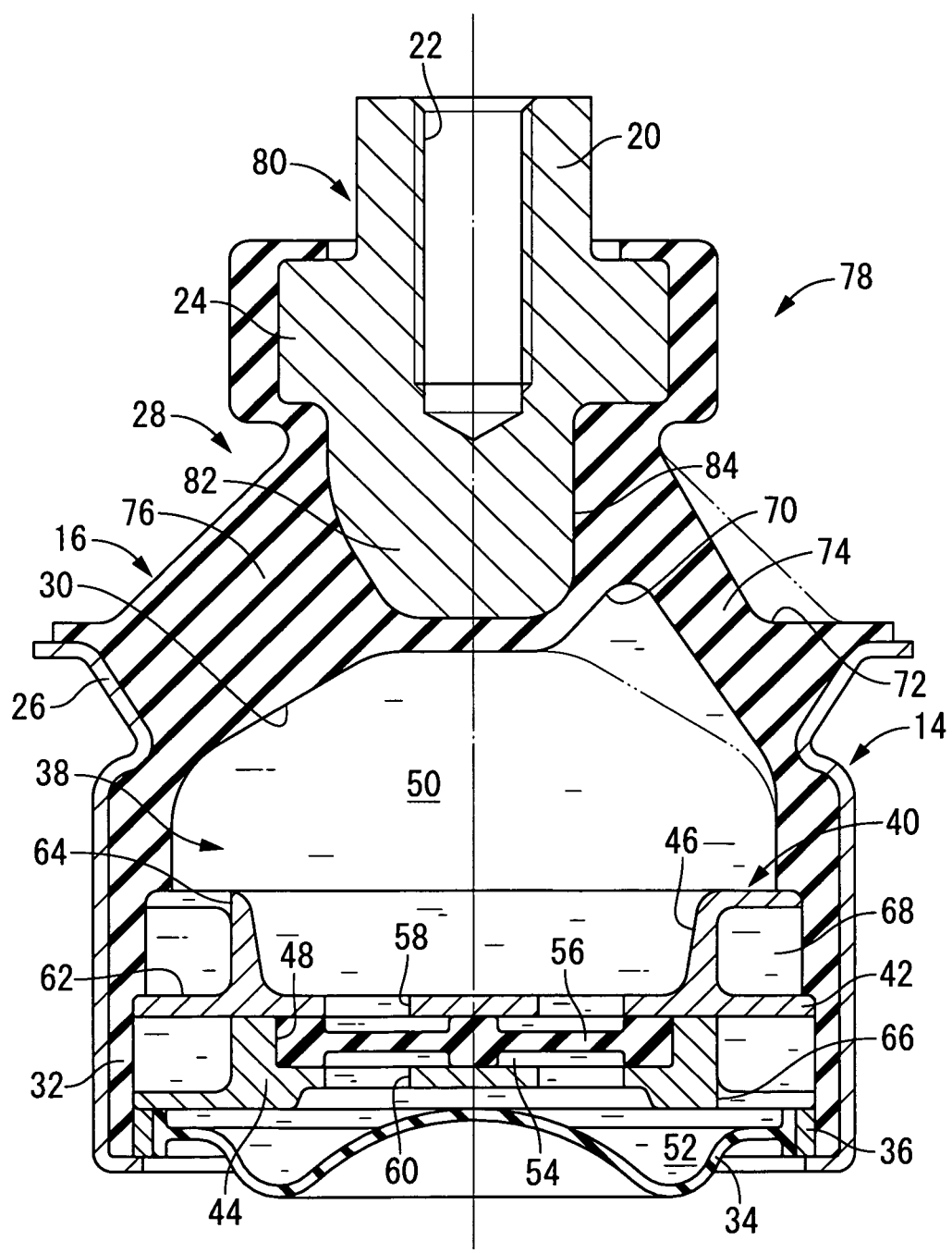
FIG. 6 is an elevational view in axial or vertical cross section of a fluid filled type vibration damping device in the form of an engine mount, which is constructed according to a second embodiment of the invention.

Next, FIG. 6 depicts an automotive engine mount 78 as a second embodiment of the fluid filled type vibration damping device according to the present invention. In the following description, components and parts that are substantially identical to those in the preceding first embodiment will be assigned like symbols, and will not be discussed in detail.

In more detail, the engine mount 78 is furnished with an inner shaft member 80 of metal. This inner shaft member 80 has a distal end section 82, a basal section 20, and an annular projecting portion 24. The distal end section 82 is generally elliptical in shape when viewed in the axial direction; a pair of opposed flat faces 84, 84 are formed on the outside face of the distal end section 82 in zones situated in opposition along an axis lying in the diametrical direction representing the minor axis direction. The direction of opposition of these opposed flat faces 84, 84, i.e. the minor axis direction, is aligned with the diametrical direction in which lie the pair of thin portions 74, 74 that have been provided to the elastic rubber body 16; and the thin portions 74 are fastened at their upper end (inside peripheral end) to the opposed flat faces 84.

With the engine mount 78 constructed according to the present embodiment, it is possible to ensure greater free length of the elastic rubber body 16 in the zones where the thin portions 74 have been formed. Thus, improved durability on the part of the elastic rubber body 16 may be more effectively achieved.

By imparting the distal end section 82 of the inner shaft member 80 with contours of constricted width in the diametrical direction of opposition of the pair of thin portions 74, 74, a higher degree of freedom will be possible in establishing the axial depth of the inside face recesses 70, and a higher degree of freedom will be possible in establishing the slope of the principal elastic axis of the thin portions 74 as well.

Figure 7:
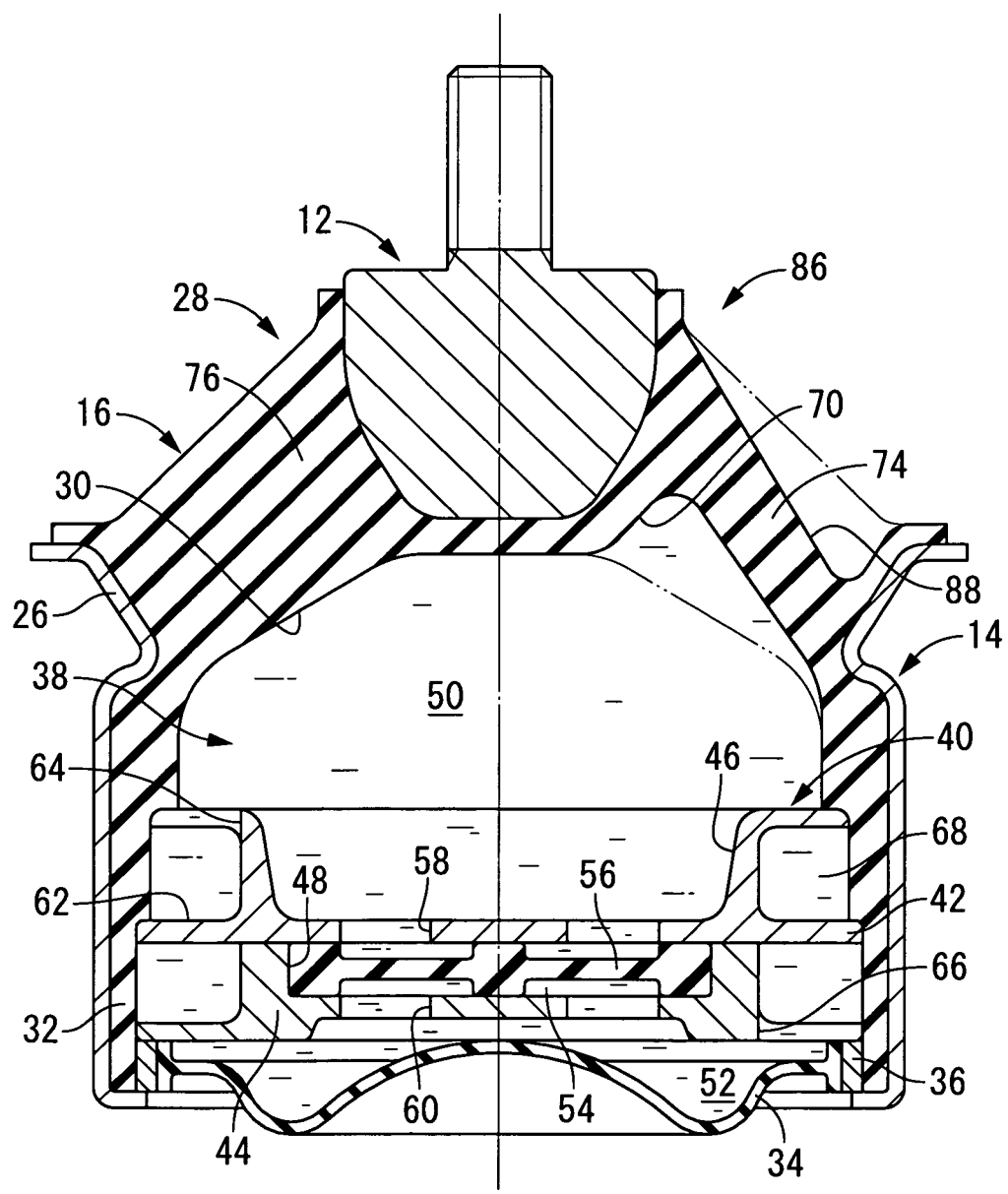
FIG. 7 is an elevational view in axial or vertical cross section of a fluid filled type vibration damping device in the form of an engine mount, which is constructed according to a third embodiment of the invention.

Next, FIG. 7 depicts an automotive engine mount 86 as a third embodiment of the fluid filled type vibration damping device according to the present invention. In this engine mount 86, outside face recesses 88 are formed on the elastic rubber body 16.

The outside face recesses 88 are formed so as to open onto the outside peripheral face of the elastic rubber body 16. As shown in FIG. 7, according to the present embodiment, the outside face recesses 88 are recessed in the axial direction so as to indent the elastic rubber body 16 in the axial direction. Specifically, in the outside face recesses 88, the inside peripheral section of the base wall slopes downward towards the outside peripheral side; the outside peripheral section of the base wall slopes upward towards the outside peripheral side; and the deepest part of each outside face recess 88 is situated axially below the inside peripheral edge and outside peripheral edge of the outside face recess 88. In the present embodiment in particular, the deepest part of the outside face recess 88 extends below the upper end of the outer tube member 14; and under the action of the distributed load of the power unit, the deepest parts of the inside face recesses 70 and the deepest parts of the outside face recesses 88 will each be situated diametrically between the inner shaft member 12 and the outer tube member 14. As in the preceding first embodiment, the outside face recesses 88 are situated with their deepest portion formed eccentrically towards the outside peripheral side of the elastic rubber body 16.

With the engine mount 86 constructed according to the present embodiment, the principal elastic axis in the thin portions 74 of the elastic rubber body 16 may be given a smaller incline with respect to the center axis of the mount. For this reason, the spring constant in the diametrical direction of opposition of the pair of thin portions 74, 74 can be kept to a low level, making it possible to more effectively prevent vibration in the vehicle lateral direction caused by sideways vibration of the engine from being transmitted to the vehicle body.

Additionally, according to the present embodiment, the outside face recesses 88 are formed so as to indent the elastic rubber body 16 in the axial direction, so that with the engine mount 86 installed in a vehicle, the inside face recesses 70 and the outside face recesses 88 will partially overlap in an axis-perpendicular projection (i.e. a projection in the diametrical direction). Further, the deepest part of the inside face recesses 70 and the deepest part of the outside face recesses 88 each penetrate into the zone between the diametrically opposed faces of the inner shaft member 12 and the outer tube member 14. Thus, in the direction of opposition of the pair of thin portions 74, 74 the spring constant can be set to a lower level, and vibration isolation in the vehicle lateral direction can be more advantageously achieved.

While the present invention has been described hereinabove in terms of certain preferred embodiments, these are merely exemplary, and the invention shall not be construed as limited in any way to the specific disclosures in the embodiments.

For example, while in each of the first to third embodiments, the elastic rubber body 16 is constituted in its entirety by a solid rubber wall, arrangements in which the elastic rubber body is only partially constituted by a solid rubber wall are possible as well. Specifically, as disclosed for example in U.S. Pat. No. 7,044,455, it would be possible to implement in the invention in a structure having a pair of axis-perpendicular liquid chambers (action liquid chambers 98) formed at locations in opposition along an axis in the diametrical direction in the axially medial section of an elastic rubber body of generally circular post shape. With a structure such as this, the zone that divides the pressure receiving chamber from the axis-perpendicular liquid chambers (the axial lower wall 46) in the elastic rubber body would serve as the solid rubber wall described in the present invention, while the zone that divides the axis-perpendicular liquid chambers from the outside space to the upper side in the axial direction (the axial upper wall 44) would serve as a portion of the elastic rubber body not constituted by the solid rubber wall. The spring constant in the axis-perpendicular direction could then be adjusted efficiently by forming the inside face recess and the outside face recess taught in the present invention, on the solid rubber wall which represents the primary support zone for vibration load.

Moreover, the first to third embodiments teach a structure in which the pressure receiving chamber 50 and the equilibrium chamber 52 are formed to either side of the partition member 40 which is supported by the outer tube member 14. However, the invention can be implemented for example in a fluid filled type vibration damping device having a structure like that taught in U.S. Pat. No. 7,168,692, in which a flexible film is disposed so as the sheath an elastic rubber body to its outside peripheral side, with a pressure receiving chamber and an equilibrium chamber being formed to either side of elastic rubber body.

Additionally, the dimensions of the inside and outside face recesses 70, 72 (88) in the circumferential, axial, and axis-perpendicular directions are not limited to any particular values, and may be established appropriately depending on the required vibration damping characteristics and the like. Further, the specific shapes of the inside and outside face recesses 70, 72 (88) taught in the first to third embodiments are merely exemplary, and it would be possible to employ different shapes. Specifically, whereas in the first to third embodiments the inside face recesses 70 are progressively shallower towards the inside peripheral side, and the inside peripheral section of the base wall of the inside face recesses 70 is a sloping face that slopes downward towards the inside peripheral side, it is also acceptable for the inside peripheral section of the base wall of the inside face recesses to extend parallel to the mount center axis. Particularly when employing the inner shaft member 80 that was disclosed in the second embodiment, by employing inside face recesses that have an inside peripheral face extending parallel to the mount center axis it will be possible to ensure that these inside face recesses 70 have a large axial dimension.

The details of construction of the fluid filled type vibration damping devices shown in the first to third embodiments above are merely exemplary and are not limited to the particular structures taught in the first to third embodiments. Specifically, the present invention can also be implemented in fluid filled type vibration damping devices of double orifice construction, furnished with a first orifice passage tuned to low frequency and a second orifice passage tuned to a higher frequency than the first orifice passage, for example. Additionally, the present invention can also be implemented in fluid filled type vibration damping devices of switchable design enabling the second orifice passage to be opened and closed by an actuator that is driven by pneumatic pressure or electric power, for example.

In the preceding first to third embodiments, the present invention has been shown reduced to practice in an automotive engine mount by way of example. However, the present invention is not limited to automotive applications, and would be possible to implement, for example, in fluid filled type vibration damping devices employed in rail cars, motorized two wheeled vehicles, bicycles, and the like. Further, the present invention is applicable not just to engine mounts, but also to body mounts, suspension mounts, and the like.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

What is claimed is:

1. A fluid filled type vibration damping device comprising:
an inner shaft member;
an outer tube member situated such that the inner shaft member is situated to a side of and spaced apart from a first opening of the outer tube member;
an elastic rubber body elastically connecting the inner shaft member and the outer tube member;
a pressure receiving chamber whose wall is partially defined by the elastic rubber body and filled with a non-compressible fluid;
an equilibrium chamber whose wall is partially defined by a flexible film and filled with a non-compressible fluid; and
an orifice passage connecting the pressure receiving chamber and the equilibrium chamber with one another, wherein:
the elastic rubber body has a solid rubber wall of frusto-conical shape defining the wall of the pressure receiving chamber, with the inner shaft member bonded to a small-diameter end of the solid rubber wall and the first opening of the outer tube member being bonded to an outside peripheral face of a large-diameter end of the solid rubber wall,
at two circumferential locations of the solid rubber wall, which two circumferential locations are opposed to each other in a first axis-perpendicular direction that is orthogonal to an axis of the device, inside-face-recesses that open onto an end face of the large-diameter end of the solid rubber wall and outside-face-recesses that open onto an outside peripheral face of the solid rubber wall are formed, respectively, so that a pair of thin portions are formed at the two circumferential locations, and a pair of thick portions that are thicker in comparison with the thin portions are formed at other two circumferential locations of the solid rubber wall, which other two circumferential locations are opposed to each other in a second axis-perpendicular direction orthogonal to the first axis-perpendicular direction as well as the axis of the device;
a deepest part of the inside-face-recesses is situated closer to the inner shaft member than the outer tube member with the inside-face-recesses having an axis-perpendicular direction cross sectional shape that becomes progressively shallower towards the outer tube member side;
a deepest part of the outside-face-recesses is situated closer to the outer tube member than the inner shaft member with the outside-face-recesses having an axis-perpendicular direction cross sectional shape that becomes progressively shallower towards the inner shaft member side, the deepest part of the outside-face-recesses defines a deepest point of the outside-face-recesses that is deeper than any other point of the outside-face-recesses;
inside peripheral sections of the inside-face-recesses have axially indented contours by virtue of indentation in an axial direction at an outside peripheral side of a distal end section of the inner shaft member;
the deepest part of the inside-face-recesses situated in an inside peripheral section of the solid rubber wall is situated closer to an axial small diameter side of the solid rubber wall than the deepest part of the outside-face-recesses situated in an outside peripheral section of the solid rubber wall, with the inside-face-recesses and the outside-face-recesses overlapping one another in the first axis-perpendicular direction of the solid rubber wall; and
when viewed from an axial view of the solid rubber wall, a circumferential width of each of the outside-face-recesses and the inside-face-recesses only gradually increases from a radially inner position to a radially outer position from the axis of the device, and the axial view is a view taken along the axis of the device.

2. The fluid filled type vibration damping device according to claim 1, wherein
outside peripheral sections of the outside-face-recesses in the thin portions of the solid rubber wall are of shapes that are recessed in the first axis-perpendicular direction to a greater extent than outside peripheral sections of the thick portions; and
bottom faces of the outside peripheral sections of the outside-face-recesses extend in the first axis-perpendicular direction without any recession in the axial direction.

3. The fluid filled type vibration damping device according to claim 1, wherein outside peripheral sections of the outside-face-recesses in the thin portions of the solid rubber wall are of shapes that are recessed in the axial direction to a greater extent than outside peripheral sections of the thick portions.

4. The fluid filled type vibration damping device according to claim 1, wherein
the outside-face-recesses made on the solid rubber wall are formed such that they do not extend to a location axially inward with respect to the outer tube member; and
the inside-face-recesses made on the solid rubber wall are formed with a depth reaching a location axially outward with respect to the outer tube member.

5. The fluid filled type vibration damping device according to claim 1, wherein
with the device installed in a vibration transmission system, an axial distal end section of the inner shaft member extends to a location axially inward from one axial opening of the outer tube member; and
in this installed state, the thick portions of the solid rubber wall is interposed between axis-perpendicularly opposed faces of the inner shaft member and the outer tube member; and in the thin portions of the solid rubber wall, the inside-face-recesses are formed through indentation of the solid rubber wall between the axis-perpendicularly opposed faces of the inner shaft member and the outer tube member.

6. The fluid filled type vibration damping device according to claim 1, wherein both the outside-face-recesses and the inside-face-recesses have fan shaped contours extending gradually in a circumferential direction from the inner shaft member side towards the outer tube member side, as seen in axial view of the solid rubber wall.

7. The fluid filled type vibration damping device according to claim 1, wherein
the inner shaft member has a distal end section of inverted frustoconical shape extending axially inward into the solid rubber wall, and a basal section of round tubular shape extending axially outward from a large diameter end part of the distal end section;
the basal section is provided with a projecting portion that extends outwardly in a third axis-perpendicular direction at a location projected axially outward from the small-diameter end of the solid rubber wall;
the solid rubber wall is bonded at the small-diameter end thereof to the distal end section and the basal section of the inner shaft member and to the bottom face of the projecting portion; and
the inside-face-recesses of the thin portions have contours produced through indentation along an outside peripheral face of the distal end section.

8. The fluid filled type vibration damping device according to claim 1, wherein a section of the inner shaft member that is bonded to the solid rubber wall has dimensions as measured in the first axis-perpendicular direction in which the thin portions are opposed to each other, which are smaller than dimensions as measured in the second axis-perpendicular direction in which the thick portions are opposed to each other.

9. The fluid filled type vibration damping device according to claim 1, wherein the elastic rubber body is composed entirely of the solid rubber wall of solid structure.

10. The fluid filled type vibration damping device according to claim 1, wherein one end of the outer tube member is blocked off by the solid rubber wall, and another end of the outer tube member is covered by the flexible film, and a partition member is disposed between opposing faces of the elastic rubber body and the flexible film while being supported by the outer tube member thereby define the pressure receiving chamber to one side of the partition member and the equilibrium chamber to another side of the partition member.

11. The fluid filled type vibration damping device according to claim 1, wherein an angle formed by a principal elastic axis of the thin portions and a center axis of the device is smaller than an angle formed by a principal elastic axis of the thick portions and the center axis of the device.

12. The fluid filled type vibration damping device according to claim 1, wherein the inside-face-recesses have a triangular shape as seen in the axial view of the solid rubber wall such that a circumferential distance between both circumferential edges of each inside-face-recess gradually expands as a radial position becomes greater.

* * * * *